US009386570B2

(12) United States Patent
Kim et al.

(10) Patent No.: US 9,386,570 B2
(45) Date of Patent: *Jul. 5, 2016

(54) METHOD FOR TRANSMITTING AN SRS-TRIGGERING-BASED SRS IN A WIRELESS COMMUNICATION SYSTEM

(71) Applicant: LG Electronics Inc., Seoul (KR)

(72) Inventors: Dongcheol Kim, Anyang-si (KR); Hangyu Cho, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/792,382

(22) Filed: Jul. 6, 2015

(65) Prior Publication Data
US 2015/0334695 A1 Nov. 19, 2015

Related U.S. Application Data

(63) Continuation of application No. 13/697,521, filed as application No. PCT/KR2011/003518 on May 12, 2011, now Pat. No. 9,107,208.

(60) Provisional application No. 61/333,763, filed on May 12, 2010.

(51) Int. Cl.
H04Q 9/00 (2006.01)
H04W 72/04 (2009.01)
H04L 5/00 (2006.01)

(52) U.S. Cl.
CPC ......... *H04W 72/0406* (2013.01); *H04L 5/0051* (2013.01); *H04W 72/0413* (2013.01); *H04L 5/001* (2013.01); *H04L 5/0053* (2013.01)

(58) Field of Classification Search
CPC .................................................... H04L 27/262
USPC .......................................................... 370/328
See application file for complete search history.

(56) References Cited

U.S. PATENT DOCUMENTS

| 9,107,208 B2* | 8/2015 | Kim ..................... H04L 5/0051 |
| 2010/0080187 A1* | 4/2010 | Papasakellariou .... H04L 5/0051 370/329 |
| 2011/0134774 A1* | 6/2011 | Pelletier .............. H04W 52/365 370/252 |
| 2011/0268028 A1* | 11/2011 | Stern-Berkowitz . H04L 27/2613 370/328 |

OTHER PUBLICATIONS

LG Electronics, "Dynamic Aperiodic Sounding for LTE-Advanced", 3GPP TSG RAN WG1 Meeting #61, R1-102731, May 2010, 3 pages.
Ericsson, et al., "Further Details on SRS for Release 10" TSG-RAN WG1 #60bis, R1-101746, Apr. 2010, 3 pages.

(Continued)

*Primary Examiner* — Wanda Z Russell
(74) *Attorney, Agent, or Firm* — Lee, Hong, Degerman, Kang & Walmey; Jonathan Kang; Michael Monaco

(57) ABSTRACT

The present invention relates to a method and terminal apparatus which involve transmitting a sounding reference signal (SRS)-triggering-based SRS in a wireless communication system. The terminal apparatus of the present invention comprises a receiver which receives, from a base station, an SRS-triggering indicator for triggering an SRS transmission; and a transmitter which transmits the SRS via a preconfigured uplink subframe in accordance with the SRS-triggering indicator.

8 Claims, 8 Drawing Sheets

(56) References Cited

OTHER PUBLICATIONS

Nokia Siemens Networks, et al., "Performance of SRS Based Channel Sounding With Uplink SU-MIMO", 3GPP TSG RAN WG1 Meeting #59bis, R1-100336, Jan. 2010, 5 pages.

Catt, "SRS Enhancements for LTE-A UL Transmission", 3GPP TSG RAN WG1 Meeting #59bis, R1-100075, Jan. 2010, 6 pages.

PCT International Application No. PCT/KR2011/003518, Written Opinion of the International Searching Authority, dated Dec. 28, 2011, 17 pages.

* cited by examiner

METHOD FOR TRANSMITTING AN SRS-TRIGGERING-BASED SRS IN A WIRELESS COMMUNICATION SYSTEM

CROSS-REFERENCE TO RELATED APPLICATIONS

This application is a continuation of U.S. patent application Ser. No. 13/697,521, filed on Jan. 10, 2013, now U.S. Pat. No. 9,107,208, which is the National Stage filing under 35 U.S.C. 371 of International Application No. PCT/KR2011/003518, filed on May 12, 2011, which claims the benefit of U.S. Provisional Application No. 61/333,763, filed on May 12, 2010, the contents of which are all hereby incorporated by reference herein in their entirety.

TECHNICAL FIELD

The present invention relates to wireless communication, and more particularly, to a method for transmitting an SRS based on SRS triggering and a user equipment for performing the same.

BACKGROUND ART

As an example of a mobile communication system to which the present invention is applicable, a 3rd Generation Partnership Project Long Term Evolution (hereinafter, referred to as 'LTE') and LTE-Advanced (hereinafter, referred to as 'LTE-A') communication system is briefly described.

FIG. 1 is a diagram schematically showing the network architecture of an E-UMTS as an exemplary mobile communication system. An Evolved Universal Mobile Telecommunications System (E-UMTS) is an advanced version of a legacy Universal Mobile Telecommunications System (UMTS) and standardization thereof is currently underway in the 3GPP. E-UMTS may be generally referred to as a Long Term Evolution (LTE) system. For details of the technical specifications of UMTS and E-UMTS, reference can respectively be made to Release 8 and Release 9 of "3rd Generation Partnership Project; Technical Specification Group Radio Access Network".

Referring to FIG. 1, E-UMTS includes a User Equipment (UE), eNode Bs (eNBs), and an Access Gateway (AG) which is located at an end of a network (Evolved-Universal Terrestrial Radio Access Network ((E-UTRAN)) and connected to an external network. The eNBs may simultaneously transmit multiple data streams for a broadcast service, a multicast service, and/or a unicast service.

One or more cells may exist in one eNB. A cell is configured to use one of bandwidths of 1.25, 2.5, 5, 10, 20 MHz to provide a downlink or uplink transport service to several UEs. Different cells may be configured to provide different bandwidths. The eNB controls data transmission and reception for a plurality of UEs. The eNB transmits downlink scheduling information with respect to downlink data to notify a corresponding UE of data transmission time/frequency domains, coding, data size, and Hybrid Automatic Repeat and reQuest (HARQ)-related information. In addition, the eNB transmits uplink scheduling information with respect to uplink data to inform a corresponding UE of available time/frequency domains, coding, data size, and HARQ-related information. An interface for transmitting user traffic or control traffic may be used between eNBs. A Core Network (CN) may include the AG, a network node for user registration of the UE, and the like. The AG manages mobility of the UE on a Tracking Area (TA) basis, wherein one TA consists of a plurality of cells.

Although radio communication technology has been developed up to LTE based on Wideband Code Division Multiple Access (WCDMA), demands and expectations of users and service providers continue to increase. In addition, since other radio access technologies continue to be developed, new technical evolution is required to secure future competitiveness. Decrease of cost per bit, increase of service availability, flexible use of a frequency band, simple structure, open interface, and suitable power consumption by a UE are required.

Recently, 3GPP has been establishing a standard task for a subsequent technique of LTE. In this disclosure, such a technique is referred to as 'LTE-A'. One of the main differences between an LTE system and an LTE-A system is system bandwidth and the introduction of a relay node.

The LTE-A system is aimed at supporting broadband of a maximum of 100 MHz and, to this end, the LTE-A system is designed to use a carrier aggregation or bandwidth aggregation technique achieving broadband using a plurality of frequency blocks.

Carrier aggregation employs a plurality of frequency blocks as one large logical frequency band in order to use a wider frequency band. A bandwidth of each frequency block may be defined based on a bandwidth of a system block used in the LTE system. Each frequency block is transmitted using a component carrier.

Although aperiodic Sounding Reference Signal (SRS) transmission has been discussed to more effectively use a plurality of uplink component carriers employed in the 3GPP LTE-A system of a future communication system and to more accurately estimate an uplink channel, a detailed method for supporting SRS transmission has not been proposed up to now.

DETAILED DESCRIPTION OF THE INVENTION

Technical Problems

It is a technical object of the present invention to provide an SRS triggering based SRS transmission method of a UE.

It is another technical object of the present invention to provide a UE for transmitting an SRS triggering based SRS.

It will be appreciated by persons skilled in the art that that the technical objects that can be achieved through the present invention are not limited to what has been particularly described hereinabove and other technical objects of the present invention will be more clearly understood from the following detailed description.

Technical Solutions

To achieve the above technical object, a method for transmitting a Sounding Reference Signal (SRS) triggering-based SRS by a user equipment in a wireless communication system according to the present invention may include receiving a SRS triggering indicator for triggering SRS transmission from a base station; and transmitting the SRS in a preconfigured uplink subframe according to the SRS triggering indicator. The SRS triggering indicator may be received through a downlink grant, an uplink grant, a group SRS message format, an SRS command of a Downlink Control Information (DCI) format, or a Transmit Power Control (TPC) command of DCI format 3/3A. The preconfigured uplink subframe may be a first uplink subframe allocated to the user equipment at a time when the SRS triggering indicator is received or a second uplink subframe allocated to the user equipment for SRS transmission after the first uplink subframe. The SRS triggering indicator may be received on a specific uplink component carrier allocated to the user equipment and the SRS may be transmitted through an uplink subframe preconfigured on the specific uplink component carrier. The group SRS message format may be scrambled using a predefined aperiodic SRS-Radio Network Temporary Identifier (SRS-RNTI) per uplink component carrier and the user equipment may transmit the SRS through the preconfigured uplink subframe on an uplink component carrier corresponding to the aperiodic SRS-RNTI corresponding to the user equipment.

To achieve the above another technical object, a User Equipment for transmitting a Sounding Reference Signal (SRS) triggering-based SRS in a wireless communication system according to the present invention may include a receiver configured to an SRS triggering indicator for triggering SRS transmission from a base station; and a transmitter configured to transmit the SRS in a preconfigured uplink subframe according to the SRS triggering indicator.

The receiver may receive the SRS triggering indicator through a downlink grant, an uplink grant, a group SRS message format, an SRS command of a Downlink Control Information (DCI) format, or a Transmit Power Control (TPC) command of DCI format 3/3A.

The preconfigured uplink subframe may be a first uplink subframe allocated to the user equipment at a time when the SRS triggering indicator is received or a second uplink subframe allocated to the user equipment for SRS transmission after the first uplink subframe. The receiver may receive the SRS triggering indicator on a specific uplink component carrier allocated to the user equipment and the transmitter may transmit the SRS through an uplink subframe preconfigured on the specific uplink component carrier. The group SRS message format may be scrambled using a predefined aperiodic SRS-Radio Network Temporary Identifier (SRS-RNTI) per uplink component carrier and the transmitter may transmit the SRS through the preconfigured uplink subframe on an uplink component carrier corresponding to the aperiodic SRS-RNTI corresponding to the user equipment.

Advantageous Effects

According to various embodiments of the present invention, an uplink SRS of a UE supporting a plurality of uplink component carriers aids in improving system performance by maximizing use efficiency of component carriers and improving communication performance through more accurate uplink channel estimation.

An SRS transmission scheme according to the present invention can be implemented using a legacy system with a minimum additional amount of information as a method for supporting dynamic SRS transmission.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included as a part of the detailed description to provide a further understanding of the invention, provide embodiments of the invention and together with the description serve to explain the principle of the invention. In the drawings.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following detailed description is given under the assumption of a 3GPP LTE system as a mobile communication system, it is applicable to other arbitrary mobile communication systems except for matters that are specific to the 3GPP LTE system.

In some instances, known structures and devices are omitted or are shown in block diagram form, focusing on important features of the structures and devices, so as not to obscure the concept of the present invention. The same reference numbers will be used throughout this specification to refer to the same parts.

The following description assumes that a User Equipment (UE) refers to a mobile or fixed user equipment such as a Mobile Station (MS) or an Advanced Mobile Station (AMS) and a Base Station (BS) refers to an arbitrary node of a network stage communicating with a UE, such as a Node B, an eNode B, or Access Point (AP).

In a mobile communication system, a UE may receive information on downlink from an eNB, and the UE may transmit information on uplink. Information transmitted and received by the UE includes data and various control information. A variety of physical channels are present according to types or usages of information transmitted or received by the UE.

Figure 1:
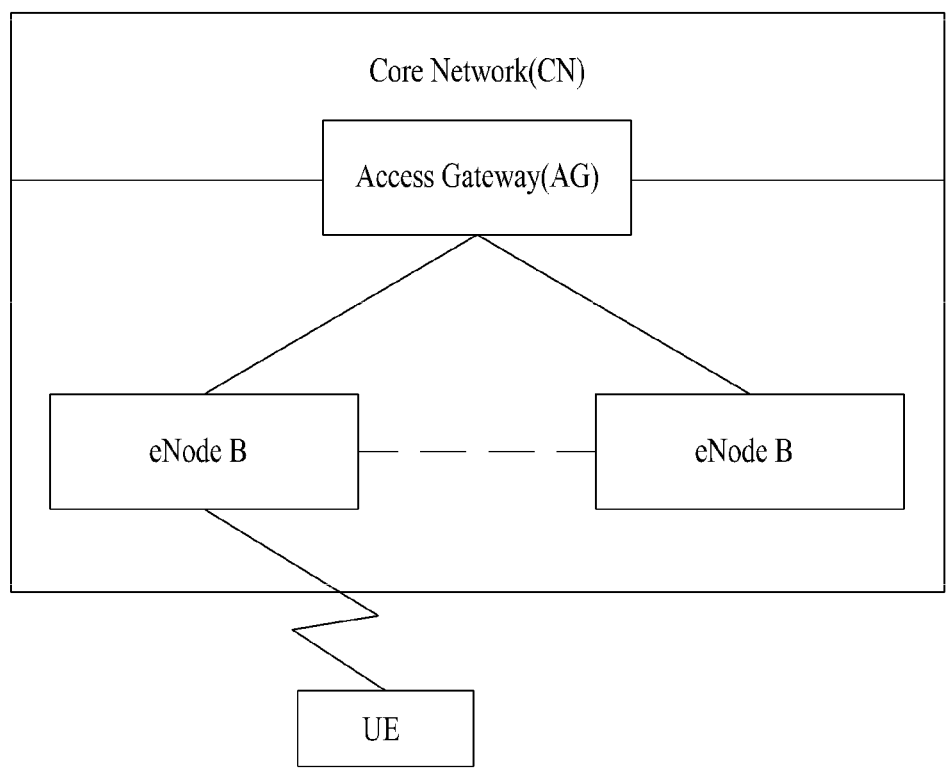
FIG. 1 is a diagram schematically showing the network architecture of an E-UMTS as an exemplary mobile communication system.
Figure 2:
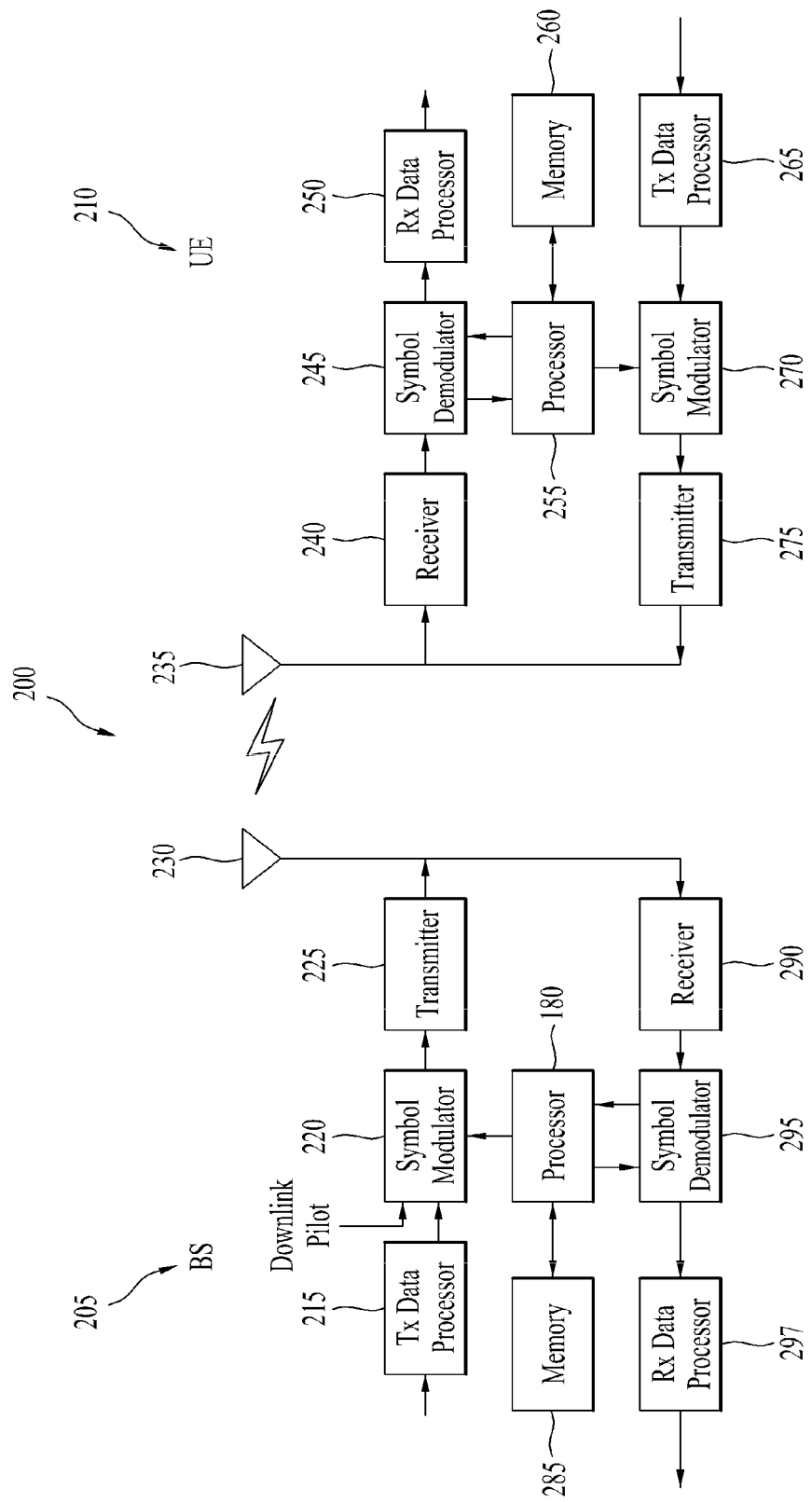
FIG. 2 is a block diagram showing the configuration of an eNB 205 and a UE 210 in a wireless communication system 200.

FIG. 2 is a block diagram showing the configuration of a BS 205 and a UE 210 in a wireless communication system 200.

The wireless communication system 200 depicts one BS 205 and one UE 210 for brevity. However, the wireless communication system 200 may include more than one BS and/or more than one UE.

Referring to FIG. 2, the BS 205 may include a transmission (Tx) data processor 215, a symbol modulator 220, a transmitter 225, a transmission/reception (Tx/Rx) antenna 230, a processor 280, a memory 285, a receiver 290, a symbol demodulator 295, and a reception (Rx) data processor 297. The UE 210 may include a Tx data processor 265, a symbol modulator 270, a transmitter 275, a Tx/Rx antenna 235, a processor 255, a memory 260, a receiver 240, a symbol demodulator 245, and an Rx data processor 250. Although one antenna 230 and one antenna 235 are depicted in the BS 205 and the UE 210, respectively, each of the BS 205 and the UE 210 includes a plurality of antennas. Accordingly, the BS 205 and the UE 210 according to the present invention support a Multiple Input Multiple Output (MIMO) system. The BS 205 according to the present invention may support both a Single User-MIMO (SU-MIMO) scheme and a Multi User-MIMO (MU-MIMO) scheme.

On downlink, the Tx data processor 215 receives, formats, codes, interleaves, and modulates (or symbol maps) traffic data and provides modulated symbols ("data symbols"). The symbol modulator 220 receives and processes the data symbols and pilot symbols and provides a stream of symbols.

The symbol modulator 220 multiplexes the data and pilot symbols and transmits the multiplexed symbols to the transmitter 225. Each transmission symbol may be a data symbol, a pilot symbol, or a signal value of zero. Pilot symbols may be sent continuously in each symbol period. The pilot symbols may be Frequency Division Multiplexed (FDM), Orthogonal Frequency Division Multiplexed (OFDM), Time Division Multiplexed (TDM), or Code Division Multiplexed (CDM) symbols.

The transmitter 225 receives and converts the stream of symbols into one or more analog signals and further coordinates (e.g., amplifies, filters, and frequency up-converts) the analog signals to generate downlink signals suitable for transmission over a radio channel. The downlink signals are then transmitted through the antenna 230 to the UE.

In the configuration of the UE 210, the antenna 235 receives the downlink signals from the BS 205 and provides the received signals to the receiver 240. The receiver 240 coordinates (e.g., filters, amplifies, and frequency down-converts) the received signals and digitizes the coordinated signals to obtain samples. The symbol demodulator 245 demodulates received pilot symbols and provides the demodulated pilot symbols to the processor 255 for channel estimation.

The symbol demodulator 245 receives a frequency response estimate for downlink from the processor 255, performs data demodulation upon received data symbols to obtain data symbol estimates (which are estimates of transmitted data symbols), and provides the data symbol estimates to the Rx data processor 250. The Rx data processor 250 demodulates (e.g., symbol demaps), deinterleaves, and decodes the data symbol estimates to recover the transmitted traffic data.

Processing by the symbol demodulator 245 and the Rx data processor 250 is complementary to processing by the symbol modulator 220 and the Tx data processor 215, respectively, in the BS 205.

On uplink, the Tx data processor 265 of the UE 210 processes traffic data and provides data symbols. The symbol modulator 270 receives and multiplexes the data symbols, performs modulation, and provides a stream of symbols to the transmitter 275. The transmitter 275 then receives and processes the stream of symbols to generate uplink signals, which are transmitted through the antenna 235 to the BS 205.

In the BS 205, the uplink signals from the UE 210 are received through the antenna 230 and the receiver 290 processes the received uplink signals to obtain samples. The symbol demodulator 295 then processes the samples and provides received pilot symbols and data symbol estimates for uplink. The Rx data processor 297 processes the data symbol estimates to recover traffic data transmitted from the UE 210.

The processors 255 and 280 of the UE 210 and the BS 205 direct (e.g., control, coordinate, manage, etc.) operation at the UE 210 and the BS 205, respectively. The respective processors 255 and 280 may be connected to the memories 260 and 285 that store program code and data. The memories 260 and 285 are connected to the processor 280 to store operating systems, applications, and general files.

The processors 255 and 280 may be referred to as controllers, microcontrollers, microprocessors, microcomputers, etc. Meanwhile, the processors 255 and 280 may be implemented by hardware, firmware, software, or combinations thereof. When embodiments of the present invention are achieved using hardware, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs), which are configured to perform the present invention, may be included in the processors 255 and 280.

On the other hand, when embodiments of the present invention are implemented using firmware or software, firmware or software may be configured to include a module, a procedure, a function, etc. performing functions or operations of the present invention. The firmware or software configured to perform the present invention may be included in the processors 255 and 280 or stored in the memories 260 and 285 so as to be executed by the processors 255 and 280.

Layers of a radio interface protocol between the UE and the BS and a radio communication system (network) may be divided into a first layer (L1), a second layer (L2), and a third layer (L3), based on the three lower layers of an Open System Interconnection (OSI) model widely known in the art of communication systems. A physical layer belongs to the first layer and provides information transfer services through a physical channel. A Radio Resource Control (RRC) layer belongs to the third layer and provides control radio resources between the UE and the network. The and the BS may exchange RRC messages with the radio communication network through the RRC layer.

Figure 3:
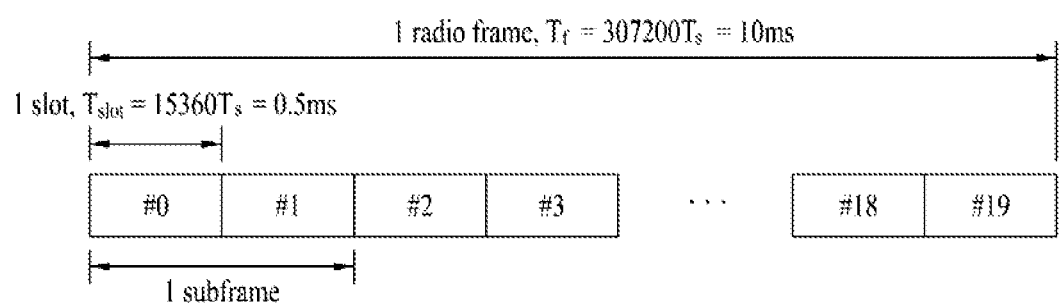
FIG. 3 is a diagram showing the structure of a radio frame used in a 3GPP LTE system which is an exemplary mobile communication system.

FIG. 3 is a diagram showing the structure of a radio frame used in a 3GPP LTE system which is an exemplary mobile communication system.

Referring to FIG. 3, one radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15 \text{ kHz} \times 2048)=3.2552 \times 10^{-8}$ (about 33 ns). Each slot includes a plurality of OFDM symbols or SC-FDMA symbols in a time domain and includes a plurality of resource blocks in a frequency domain.

In the LTE system, one resource block includes 12 subcarriers×7 (or 6) OFDM symbols or Single Carrier-Frequency Division Multiple Access (SC-FDMA) symbols. A Transmission Time Interval (TTI) which is a unit time for data transmission may be determined in units of one or more subframes. The above-described structure of the radio frame is purely exemplary and various modifications may be made in the number of subframes included in the radio frame, the number of slots included in the subframe, and the number of OFDM or SC-FDMA symbols included in the slot.

Figure 4A:
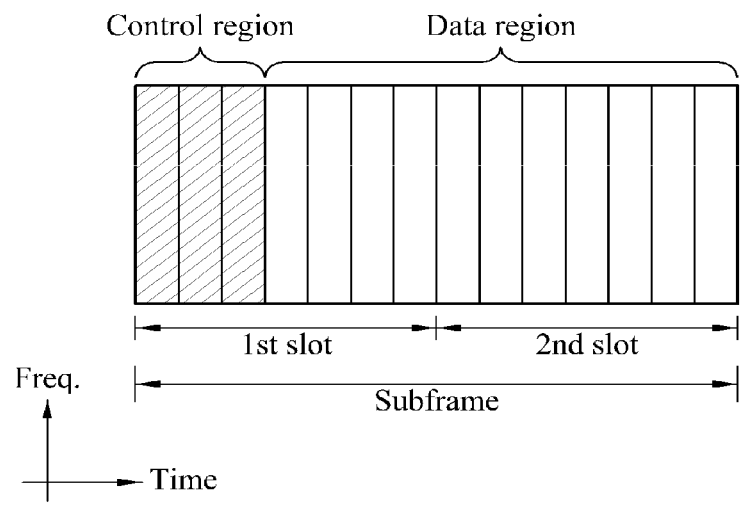
FIGS. 4a and 4b are diagrams showing the structures of downlink and uplink subframes of a 3GPP LTE system which is an exemplary mobile communication system.
Figure 4B:
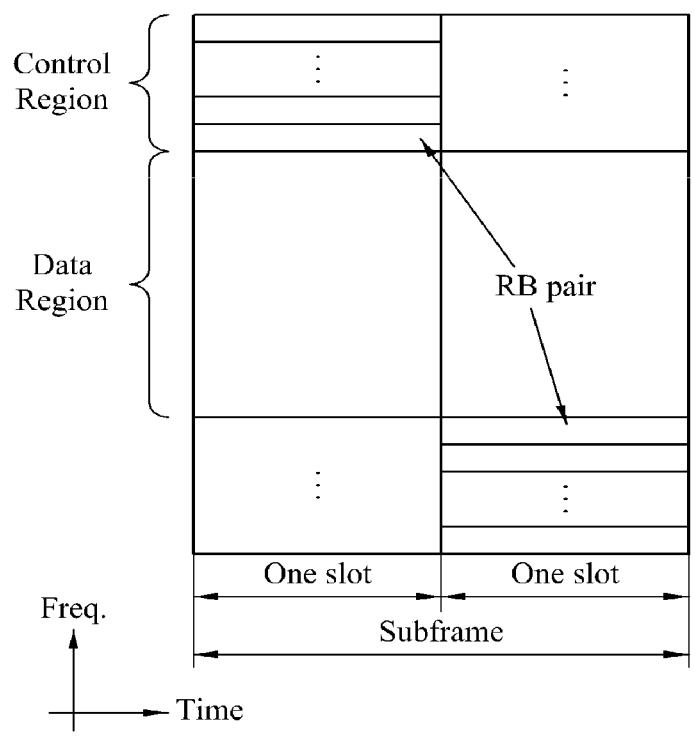

FIGS. 4a and 4b are diagrams showing the structures of downlink and uplink subframes of a 3GPP LTE system which is an exemplary mobile communication system.

Referring to FIG. 4a, one downlink subframe includes two slots in a time domain. A maximum of 3 front OFDM symbols of the first slot within the downlink subframe is a control region in which control channels are allocated, and the other OFDM symbols are a data region in which a Physical Downlink Shared Channel (PDSCH) is allocated.

Downlink control channels used in the 3GPP LTE system include a Physical Control Format Indicator Channel (PCFICH), a Physical Downlink Control Channel (PDCCH), a Physical Hybrid-ARQ Indicator Channel (PHICH), etc. The PCFICH, which is transmitted in the first OFDM symbol of a subframe, carries information about the number of OFDM symbols, (i.e. the size of a control region), used for transmission of control channels within the subframe. Control information transmitted through the PDCCH is referred to as Downlink Control Information (DCI). The DCI indicates uplink resource allocation information, downlink resource allocation information, and an uplink transmit power control command for certain UE groups. The PHICH carries Acknowledgement (ACK)/Negative-Acknowledgement (NACK) signals for uplink Hybrid Automatic Repeat Request (HARQ). Namely, the ACK/NACK signals for uplink data transmitted by a UE are transmitted on the PHICH.

Now, a PDCCH, which is a downlink physical channel, is described.

A BS may transmit, through the PDCCH, a PDSCH resource allocation and transport format (this may be referred to as downlink grant), PUSCH resource allocation information (this may be referred to as uplink grant), aggregation of Transmit Power Control (TPC) commands for a certain UE or individual UEs within a certain UE group, and activation information of Voice over Internet Protocol (VoIP). The BS may transmit a plurality of PDCCHs within a control region and a UE may monitor the plurality of PDCCHs. The PDCCH is comprised of aggregation of one or a plurality of continuous Control Channel Elements (CCEs). The BS may transmit the PDCCH comprised of aggregation of one or plural continuous CCEs through the control region after sub-block interleaving. A CCE is a logical allocation unit used to provide code rate according to the state of a radio channel to the PDCCH. The CCE corresponds to a plurality of Resource Element Groups (REGs). A format of the PDCCH and the number of available bits of the PDCCH are determined according to a correlation between the number of CCEs and the code rate provided by the CCEs.

Control information that the BS transmits through the PDCCH is referred to as Downlink Control Information (DCI). The BS may transmit control information transmitted through the PDCCH according to a DCI format shown in the following Table 1.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCQH codeword and random access procedure initiated by a PDCCH order |

TABLE 1-continued

| DCI Format | Description |
| --- | --- |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

Referring to Table 1, DCI format 0 indicates uplink resource allocation information. DCI formats 1 and 2 indicate downlink resource allocation information. DCI formats 3 and 3A indicate uplink TPC commands for certain UE groups. DCI format 3/3A includes TPC commands for a plurality of UEs. In case of DCI format 3/3A, the BS masks TPC-ID onto Cyclic Redundancy Check (CRC). TPC-ID is an ID that a UE demasks to monitor a PDCCH carrying a TPC command. TPC-ID may be an ID used by the UE that decodes the PDCCH to check whether the TPC command is transmitted over the PDCCH. TPC-ID may be defined by reusing conventional IDs, i.e. a Cell-Radio Network Temporary Identifier (C-RNTI), a Paging Indication-Radio Network Temporary Identifier (PI-RNTI), a System Change-Radio Network Temporary Identifier (SC-RNTI), and a Random Access Radio Network Temporary Identifier (RA-RNTI) or may be defined as a new ID. TPC-ID is different from C-RNTI acting as an ID of a specific UE and from PI-RNTI, SC-RNTI, and RA-RNTI of IDs for all UEs contained in the cell, in that TPC-ID is an ID for UEs of a specific aggregate contained in a cell. If DCI includes TPC commands for N UEs, only the N UEs need to receive the TPC commands. If TPC commands for all UEs in the cell are contained in DCI, TPC-ID is used as an ID for all UEs contained in the cell.

The UE monitors an aggregate of PDCCH candidates in a search space contained in a subframe to search for TPC-ID. In this case, TPC-ID may be found either in a common search space or in a UE-specific search space. The common search space is a search space in which all UEs contained in the cell can perform the searching operation. The UE-specific search space is a search space in which a specific UE can perform the searching operation. If no CRC error is detected by demasking TPC-ID in the corresponding PDCCH candidate, the UE can receive a TPC command on a PDCCH.

An ID, i.e. TPC-ID, for a PDCCH carrying only a plurality of TPC commands is defined. If TPC-ID is detected, the UE receives a TPC command on the corresponding PDCCH. The TPC command is used to adjust transmit power of an uplink channel. Therefore, the TPC command can prevent failure of data transmission to a BS due to incorrect power control or prevent interference for other UEs.

Hereinbelow, a resource mapping method of a BS for PDCCH transmission in an LTE system will be described in brief.

Generally, the BS may transmit scheduling allocation information and other control information through a PDCCH. A physical control channel may be transmitted on one aggregate or a plurality of consecutive CCEs. One CCE includes 9 REGs. The number of REGs which are not allocated to a PCFICH or PHICH is $N_{REG}$. The number of available CCEs in the system are from 0 to $N_{CCE}-1$ (where $N_{CCE}=\lfloor N_{REG}/9 \rfloor$). The PDCCH supports multiple formats as shown in the following Table 2. One PDCCH consisting of n consecutive CCEs starts from a CCE performing i mode n=0 (where i is a CCE number). Multiple PDCCHs may be transmitted in one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, the BS may determine the PDCCH format depending on to how many regions control information is to be transmitted. The UE may reduce overhead by reading control information in units of CCEs.

Referring to FIG. 4b, an uplink subframe may be divided into a control region and a data region in a frequency domain. The control region is assigned a Physical Uplink Control Channel (PUCCH) carrying uplink control information. The data region is assigned a Physical Uplink Shared Channel (PUSCH) carrying user data. To maintain a single carrier characteristic, one UE does not transmit the PUCCH and the PUSCH simultaneously. A PUCCH for one UE may be allocated as a Resource Block (RB) pair in one subframe. RBs belonging to the RB pair occupy different subcarriers in two slots. The RB pair allocated to the PUCCH is frequency-hopped at a slot boundary.

Figure 5:
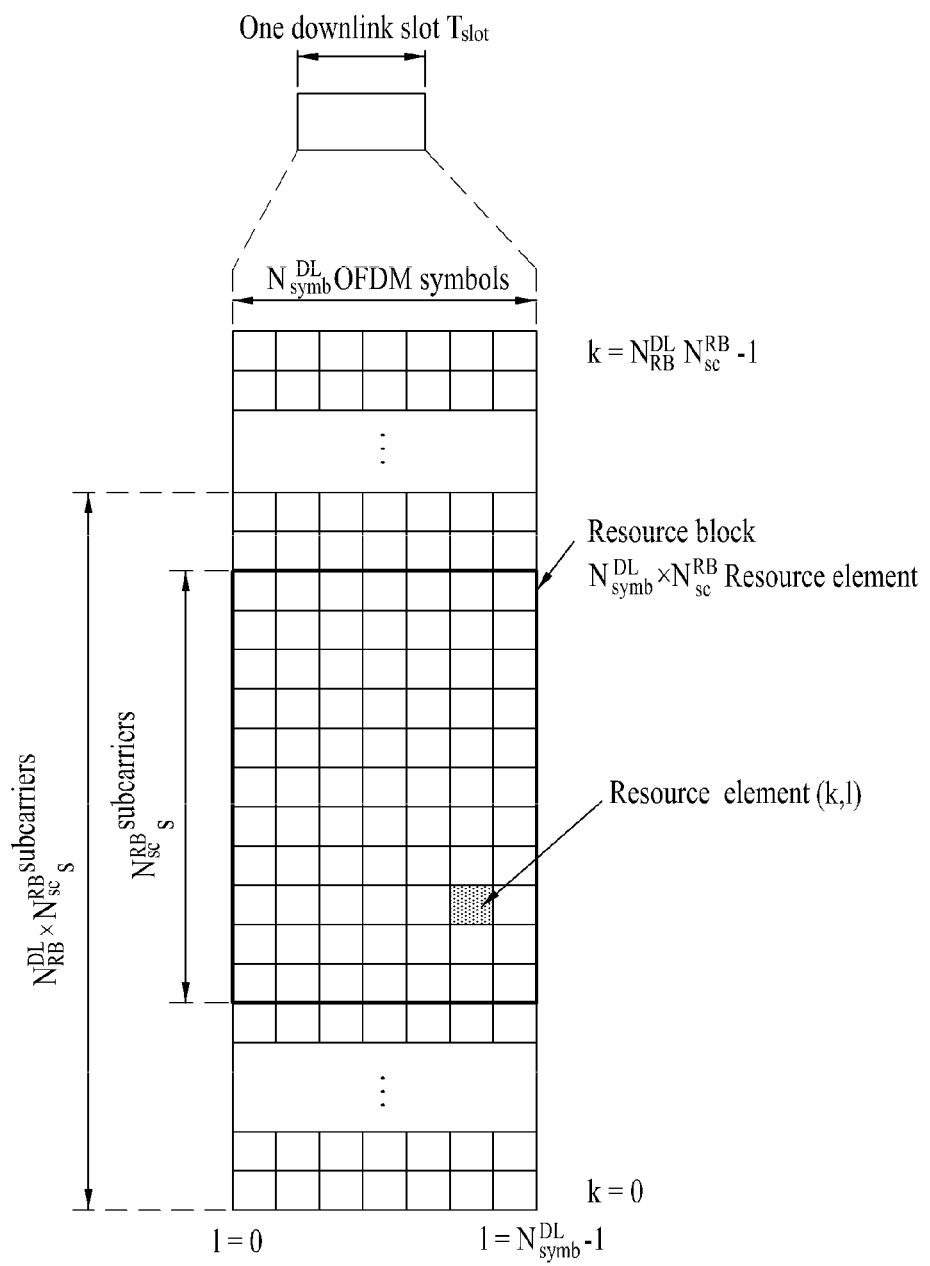
FIG. 5 is a diagram showing a downlink time-frequency resource grid structure used in a 3GPP LTE system.

FIG. 5 is a diagram showing a downlink time-frequency resource grid structure used in a 3GPP LTE system.

A downlink signal transmitted in each slot uses a resource grid structure including $N_{RB}^{DL} \times N_{SC}^{RB}$ subcarriers and $N_{symb}^{DL}$ OFDM symbols, wherein $N_{RB}^{DL}$ represents the number of RBs in downlink, $N_{SC}^{RB}$ represents the number of subcarriers constituting one RB, and $N_{symb}^{DL}$ represents the number of OFDM symbols in one downlink slot. The size of $N_{RB}^{DL}$ varies according to a downlink transmission bandwidth configured within a cell and should satisfy $N_{RB}^{min,DL} \leq N_{RB}^{DL} \leq N_{RB}^{max,DL}$ wherein $N_{RB}^{min,DL}$ and $N_{RB}^{max,RB}$ denote the smallest downlink bandwidth supported and the largest downlink bandwidth, respectively, supported by a wireless communication system. $N_{RB}^{min,DL}$ may be 6 and $N_{RB}^{max,RB}$ may be 110. However, the bandwidth values are not limited thereto. The number of OFDM symbols included in one slot may vary according to the length of a Cyclic Prefix (CP) and the spacing between subcarriers. In case of MIMO transmission, one resource grid per antenna port may be defined.

Each element in the resource grid for each antenna port is referred to as a Resource Element (RE) and is uniquely identified by an index pair (k, l) in a slot, wherein k is a frequency-domain index having any one value of 0 to $N_{RB}^{DL}N_{SC}^{RB}-1$ and l is a time-domain index having any one value of 0 to $N_{symb}^{DL}-1$.

The RB shown in FIG. 5 is used to describe a mapping relationship between any physical channel and REs. The RB may be divided into a Physical Resource Block (PRB) and a Virtual Resource Block (VRB). One PRB is defined as $N_{symb}^{DL}$ consecutive OFDM symbols in the time domain and $N_{SC}^{RB}$ consecutive subcarriers in the frequency domain, wherein $N_{symb}^{DL}$ and $N_{SC}^{RB}$ may be predetermined values. For example, $N_{symb}^{DL}$ and $N_{SC}^{RB}$ may be given as shown in the following Table 3. Accordingly, one PRB includes $N_{symb}^{DL} \times N_{SC}^{RB}$ REs. Although one PRB may correspond to one slot in the time domain and to 180 kHz in the frequency domain, the PRB is not limited thereto.

TABLE 3

| Configuration | | $N_{sc}^{RB}$ | $N_{symb}^{DL}$ |
| --- | --- | --- | --- |
| Normal cyclic prefix | $\Delta f = 15$ kHz | 12 | 7 |
| Extended cyclic prefix | $\Delta f = 15$ kHz | | 6 |
| | $\Delta f = 7.5$ kHz | 24 | 3 |

The PRB has a value ranging from 0 to $N_{RB}^{DL}-1$. A relationship between a PRB number $n_{PRB}$ in the frequency domain and a RE (k,l) in one slot satisfies $$n_{PRB} = \left\lfloor \frac{k}{N_{SC}^{RB}} \right\rfloor.$$

The size of the VRB is the same as the size of the PRB. The VRB may be divided into a Localized VRB (LVRB) and a Distributed VRB (DVRB). With respect to each type of VRB, one pair of VRBs in two slots within one subframe is allocated together with a single VRB number $n_{VRB}$.

The size of the VRB may be the same as the size of the PRB. Two types of VRBs are defined as a Localized VRB (LVRB) and a Distributed VRB (DVRB). With respect to each type of VRB, a pair of VRBs is allocated over two slots of one subframe with a single VRB index (hereinafter, this may be referred to as a VRB number). In other words, any one of indexes ranging from 0 to $N_{RB}^{DL}-1$ is allocated to each of $N_{RB}^{DL}$ VRBs belonging to a first slot of two slots constituting one subframe and any one of indexes ranging from 0 to $N_{RB}^{DL}-1$ is likewise allocated to each of $N_{RB}^{DL}$ VRBs belonging to a second slot of two slots constituting one subframe.

PDCCH transmission of a BS to a UE in an LTE system will now be described.

The BS determines a PDCCH format according to DCI to be transmitted to the UE and attaches CRC to control information. A unique ID (referred to as RNTI) is masked to the CRC according to the owner or purposes of the PDCCH. If the PDCCH is dedicated to a specific UE, a unique ID of the UE, e.g. C-RNTI, may be masked to the CRC. If the PDCCH is dedicated to a paging message, a paging indication ID, e.g. paging-RNTI (P-RNTI), may be masked to the CRC. If the PDCCH is for system information, a System Information RNTI (SI-RNTI) may be masked to the CRC. A Random Access RNTI (RA-RNTI) may be masked to the CRC to indicate a random access response that is a response to a random access preamble of the UE. The following Table 4 shows an example of IDs masked to the PDCCH.

TABLE 4

| Type | Identifier | Description |
| --- | --- | --- |
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control |

TABLE 4-continued

| Type | Identifier | Description |
|---|---|---|
| | | command (It could be differentiated according to the index of UE TPC group). |

If C-RNTI is used, the PDCCH carries control information for a corresponding specific UE and, if other RNTIs are used, the PDCCH carries common control information received by all or plural UEs in a cell. The BS channel-codes DCI to which CRC is attached to generate coded data. The BS performs rate matching according to the number of CCEs allocated to a PDCCH format. Next, the BS modulates the coded data to generate modulated symbols. The BS maps the modulated symbols to physical REs.

Figure 6:
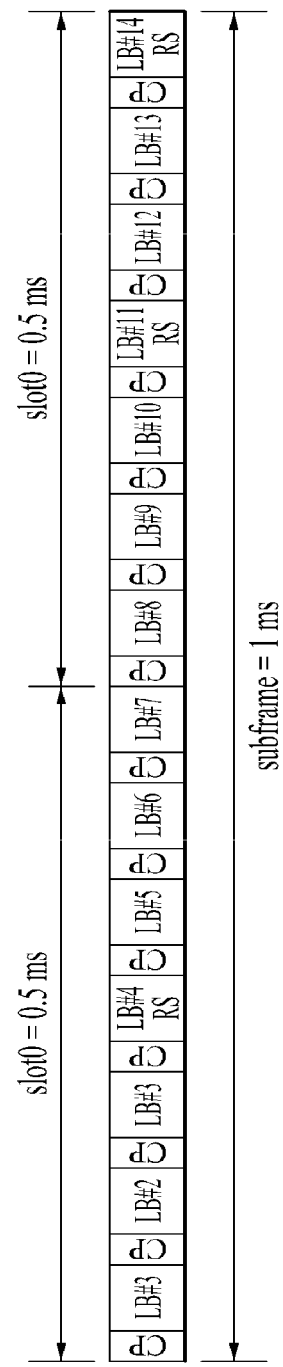
FIG. 6 is a diagram showing the exemplary configuration of an uplink subframe including an SRS symbol in a 3GPP LTE system.

FIG. 6 is a diagram showing the exemplary configuration of an uplink subframe including an SRS symbol in a 3GPP LTE system.

Referring to FIG. 6, a Sounding Reference Signal (SRS) has no relation to transmission of uplink data and/or control information and is mainly used to evaluate channel quality such that a BS can perform frequency-selective scheduling on uplink. However, recently, the SRS may be used for other purposes, for example, providing various functions to a non-scheduled UE or improving power control. The SRS is a pilot signal transmitted by each UE to the BS as a reference signal used for uplink channel measurement and is used by the BS to estimate a channel state from each UE to the BS. A channel for transmitting the SRS may have a different transmission bandwidth and transmission period per UE according to the state of each UE. The BS may determine whether to schedule a data channel of a UE in every subframe based on the result of channel estimation.

The SRS may also be used to estimate downlink channel quality under the assumption that a radio channel has a reciprocal relationship between uplink and downlink. Such assumption will be more effective in a Time Division Duplexing (TDD) system in which uplink and downlink share the same frequency domain and are divided in the time domain. As shown in FIG. 6, the UE may transmit the SRS through the last SC-FDMA symbol in a subframe. Therefore, the SRS and a Demodulation-Reference Signal (DM-RS) are located in different SC-FDMA symbols in a subframe. SRSs of multiple UEs transmitted through the last SC-FDMA symbol of the same subframe may be distinguished from each other according to positions in the frequency domain. Since the UE does not transmit data of a PUSCH through the SC-FDMA symbol designed for the SRS, an SRS symbol is occupied in every subframe in the worst case and thus sounding overhead of 7% occurs.

The SRS is generated by a Constant Amplitude Zero Auto Correlation (CAZAC) sequence. SRSs transmitted from multiple UEs may be distinguished from each other by a CAZAC sequence ($r^{SRS}(n) = r_{u,v}^{(\alpha)}(n)$) having a different cyclic shift value $\alpha$ according to the following Equation 1, wherein $r^{SRS}(n)$ is an SRS sequence.

$$\alpha = 2\pi \frac{n_{SRS}^{cs}}{8} \quad \text{Equation 1}$$

where $n_{SRS}^{cs}$ is a value configured for each UE by a higher layer and is an integer of 0 to 7. CAZAC sequences, which are generated through cyclic shift from one CAZAC sequence, have a characteristic in that they have zero-correlation with sequences having cyclic shift values different therefrom. Using such a characteristic, SRSs in the same frequency domain can be distinguished according to cyclic shift values of CAZAC sequences. An SRS of each UE is allocated in the frequency domain according to a parameter set by a BS. A UE performs frequency hopping of the SRS so that the SRS can be transmitted throughout a whole uplink data transmission bandwidth.

As mentioned above, the 3GPP LTE Release 8/9 system supports only periodic SRS transmission of the UE and, through this, the BS can estimate the uplink channel quality of each UE. In this case, a channel estimated by the BS is used for functions such as frequency dependent scheduling, link level adaptation, timing estimation, and uplink power control. The BS may UE-specifically or cell-specifically transmit SRS uplink configuration to each UE through an SRS parameter by higher layer signaling (e.g. RRC signaling). The BS may inform the UE of SRS uplink configuration information shown in Table 5 as an SRS uplink configuration information element message type.

TABLE 5

SoundingRS-UL-Config information element

```
-- ASN1START
SoundingRS-UL-ConfigCommon ::=    CHOICE {
    release                       NULL,
    setup                         SEQUENCE {
        srs-BandwidthConfig           ENUMERATED {bw0, bw1, bw2, bw3, bw4, bw5, bw6, bw7},
        srs-SubframeConfig            ENUMERATED {
                                          sc0, sc1, sc2, sc3, sc4, sc5, sc6, sc7,
                                          sc8, sc9, sc10, sc11, sc12, sc13, sc14, sc15},
        ackNackSRS-SimultaneousTransmission BOOLEAN,
        srs-MaxUpPts                  ENUMERATED {true}      OPTIONAL   -- Cond TDD
    }
}
SoundingRS-UL-ConfigDedicated ::= CHOICE{
    release                       NULL,
    setup                         SEQUENCE {
        srs-Bandwidth                 ENUMERATED {bw0, bw1, bw2, bw3},
        srs-HoppingBandwidth          ENUMERATED {hbw0, hbw1, hbw2, hbw3},
        freqDomainPosition            INTEGER (0..23),
        duration                      BOOLEAN,
        srs-ConfigIndex               INTEGER (0..1023),
        transmissionComb              INTEGER (0..1),
```

TABLE 5-continued

| SoundingRS-UL-Config information element | |
|---|---|
| cyclicShift cs7} } | ENUMERATED {cs0, cs1, cs2, cs3, cs4, cs5, cs6, |

The following Table 6 shows SRS configuration parameters included in a type of a SoundingRS-UL-Config information element message in Table 5.

TABLE 6

| Sounding RS parameter name | Significance | Signaling type |
|---|---|---|
| srsBandwidthConfiguration | Maximum SRS bandwidth in the cell | Cell-specific |
| srsSubframeConfiguration | Sets of subframes in which SRS may be transmitted in the cell | Cell-specific |
| srsBandwidth | SRS transmission bandwidth for a UE | UE-specific |
| frequencyDomainPosition | Frequency-domain position | UE-specific |
| srsHoppingBandwidth | Frequency hop size | UE-specific |
| duration | Single SRS or periodic | UE-specific |
| srsConfigurationIndex | Periodicity and subframe offset | UE-specific |
| transmissionComb | Transmission comb offset | UE-specific |
| $n^{cs}SRS$ | Cyclic shift | UE-specific |

Referring to Table 5 and Table 6, SRS configuration information of which the BS informs the UE may include an srsBandwidthConfiguration parameter, an srsSubframeConfiguration parameter, an srsBandwidth parameter, a frequencyDomainPosition parameter, an SrsHoppingBandwidth parameter, a duration parameter, an srsConfigurationIndex parameter, and a transmission Comb parameter, as SRS configuration parameters. The srsBandwidthConfiguration parameter indicates information about a maximum SRS bandwidth in a cell and the srsSubframeConfiguration parameter indicates information about a subframe set in which the UE is to transmit an SRS in a cell. The BS may inform the UE of the srsSubframeConfiguration parameter through cell-specific signaling. As shown in Table 5, the BS may signal the srsSubframeConfiguration parameter to the UE as 4-bit size (indicating sc0, sc1, sc2, sc3, sc4, sc5, sc6, sc7 sc8 sc9 sc10, sc11, sc12, sc13, sc14, and sc15). The srsBandwidth parameter indicates an SRS transmission bandwidth of the UE, the frequencyDomainPosition parameter indicates the position of the frequency domain, the SrsHoppingBandwidth parameter indicates a frequency hopping size of an SRS, the duration parameter represents whether SRS transmission is one-shot SRS transmission or periodic SRS transmission, the srsConfigurationIndex parameter indicates periodicity of an SRS and a subframe offset (e.g. time unit up to a subframe in which the first SRS is transmitted in the first subframe of a frame), and the transmission Comb parameter represents a transmission comb offset.

The BS may inform the UE of the srsBandwidthConfiguration parameter and the srsSubframeConfiguration parameter through cell-specific signaling. Alternatively, the BS may inform the UE of the srsBandwidth parameter, frequencyDomainPosition parameter, SrsHoppingBandwidth parameter, duration parameter, srsConfigurationIndex parameter, and transmission Comb parameter through UE-specific signaling.

Up to now, SRS configuration and SRS configuration information in the 3GPP LTE system have been described. The BS may inform the UE of an SRS configuration message (including information about a subframe set in which an SRS is transmitted) through higher layer signaling and the UE may transmit the SRS according to the corresponding message. A 3GPP LTE Release 10 system which is an exemplary future communication system supports aperiodic SRS transmission for more adaptive uplink channel quality estimation and more efficient SRS resource use than in a legacy system.

A method for triggering aperiodic SRS transmission of the UE is currently underway. As an example, the BS may trigger aperiodic SRS transmission by an uplink grant in a PDCCH. Thus, if aperiodic SRS transmission is supported, SRS transmission may be divided into a method for periodically transmitting an SRS and a one-shot method for transmitting an SRS by aperiodic SRS triggering. The BS may inform the UE as to whether SRS transmission is one-shot SRS transmission or periodic SRS transmission through a 1-bit indicator in the duration parameter. In case of periodic SRS transmission, the BS may transmit the srsConfigurationIndex parameter (e.g. 10 bits) including information about SRS periodicity and subframe offset to the UE.

Meanwhile, a future wireless communication system of an LTE system is referred to as an LTE-A system in 3GPP and the LTE-A system satisfies future-directed service demands. The LTE-A system adopts a Carrier Aggregation (CA) technique to transmit a plurality of Component Carriers (CCs) through aggregation. As a result, the transmission bandwidth of the UE is improved and frequency use efficiency is increased. The LTE-A system can extend a bandwidth up to 100 MHz by simultaneously using aggregation of a plurality of carriers (i.e. multicarrier) rather than a single carrier used in legacy LTE release 8/9. In other words, a carrier defined as a maximum of 20 MHz in legacy LTE release 8/9 is redefined as a CC and the UE is able to use a maximum of, for example, 5 CCs through the CA technique.

A current CA aggregation technique has the following characteristics.

(1) Aggregation of contiguous CCs is supported and aggregation of non-contiguous CCs is supported.

(2) The number of aggregated CCs may be different in uplink and downlink. If compatibility with a legacy system is needed, uplink and downlink should configure the same number of CCs.

(3) Different transmission bandwidths can be obtained by configuring a different number of CCs in uplink/downlink.

(4) For a UE, each CC independently transmits one transport block and includes an independent HARQ mechanism.

Unlike a legacy LTE system using one carrier, a method for effectively managing CCs is needed in CA of the LTE-A system using a plurality of CCs. To effectively manage CCs, CCs may be classified according to role and feature. CCs may be divided into a Primary Component Carrier (PCC) and Secondary Component Carriers (SCCs). The PCC is a central CC of CC management when a plurality of CCs is used and one PCC is defined per UE. The PCC may be referred to as a Primary Cell (Pcell).

The other CCs except for one PCC are defined as SCCs. The SCCs may be referred to as Secondary cells (Scells). The PCC may serve as a core carrier for managing all aggregated CCs and the other SCells may function to provide additional frequency resources for high transmission rate. For example, the BS may access the UE for (RRC) signaling through the PCC. Security between the BS and the UE and information for higher layers may also be provided through the PCC. Actually, when only one CC is present, the corresponding CC is the PCC and, at this time, the CC is in charge of the same function as a carrier of the legacy LTE system.

The BS may allocate an Activated Component Carrier (ACC) among a plurality of CCs to the UE. The UE is able to previously identify the ACC allocated thereto through signaling.

The above-described SRS transmission and SRS configuration are performed based on a single carrier. Accordingly, the present invention proposes a method for supporting SRS transmission and a method for supporting aperiodic SRS transmission, in an LTE-A system using a plurality of downlink/uplink CCs.

It is desirable that SRS transmission is be configured by a one-shot scheme of aperiodic SRS transmission per CC. However, SRS transmission may be configured by periodic SRS transmission according to situation. A method for the BS to inform the UE of SRS configuration through upper layer configuration (e.g. RRC configuration) may be ineffective in adaptive SRS transmission due to occurrence of system delay.

Therefore, the present invention proposes a method for solving system delay generated by SRS configuration information transmission according to a conventional RRC configuration method when a plurality of uplink CCs is supported. As a method for increasing efficiency of SRS resources, SRS transmission may be configured on a grouped UE basis to use resources of time and frequency units allocated for subsequent SRS transmission.

Figure 7:
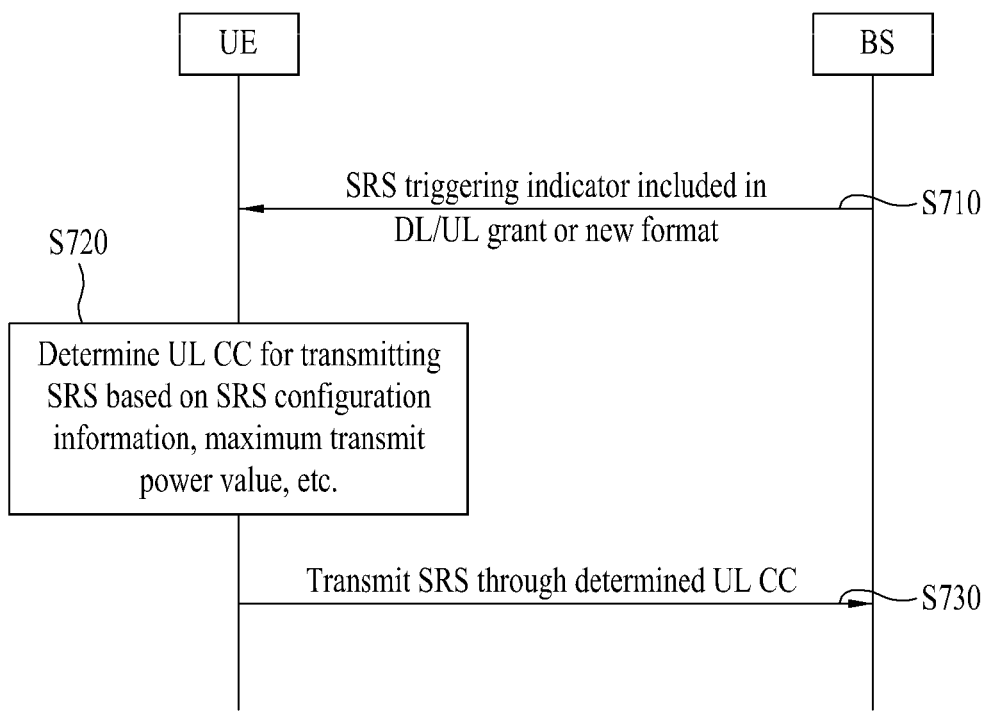
FIG. 7 is a diagram showing exemplary aperiodic SRS transmission of a UE according to an embodiment of the present invention.

FIG. 7 is a diagram showing exemplary aperiodic SRS transmission of a UE according to an embodiment of the present invention.

To support aperiodic SRS transmission, a BS reuses an SRS configuration method in a higher layer (e.g. RRC layer) and may inform a UE as to whether to trigger aperiodic SRS transmission. In other words, the BS may set aperiodic SRS configuration in the higher layer. Here, aperiodic SRS configuration may include information about a subframe in which the UE is to transmit an aperiodic SRS according to aperiodic SRS triggering (for example, information about an uplink subframe for aperiodic SRS transmission corresponding to a triggered subframe) with respect to each CC. The UE may perform SRS transmission in a corresponding uplink CC according to aperiodic SRS configuration set by the BS. Even in this case, aperiodic SRS configuration in the higher layer (e.g. RRC layer) is premised on configuration per UE in every uplink CC.

Referring to FIG. 7, in order to trigger aperiodic SRS transmission, the BS may trigger aperiodic SRS transmission to the UE through a 1-bit indicator per uplink CC (S710). If the BS requests the UE to perform aperiodic SRS transmission using a 1-bit (or 2-bit or more) indicator, the UE may perform aperiodic SRS transmission based on aperiodic SRS configuration information indicated in the higher layer (e.g. RRC layer).

Similarly, timer-based transmission may be used. In this case, the BS may transmit an indicator indicating aperiodic SRS transmission triggering through, for example, DCI format 3/3A at an arbitrary time point, thereby making it possible to precisely control aperiodic SRS transmission. The BS may inform the UE of the 1-bit indicator (or 1-bit triggering indicator) for triggering aperiodic SRS transmission through a downlink grant or uplink grant of an existing DCI format or through a newly defined message format (e.g. newly defined DCI format) (S710).

The processor 255 of the UE may determine a corresponding uplink CC on which an SRS is to be transmitted based on the aperiodic SRS transmission triggering indicator, downlink grant, uplink grant, or new message format received from the BS (S720). At this time, the processor 255 of the UE may select the number of uplink CCs on which the SRS is to be transmitted in consideration of a limited maximum uplink transmit power value thereof. Alternatively, the processor 255 of the UE may determine all uplink CCs or partial uplink CCs that can be used thereby based on aperiodic SRS configuration information including information as to the number of uplink CCs for SRS transmission (e.g. information about uplink CC indexes on which an SRS is to be transmitted) determined by the BS (e.g. the BS can determine in a higher layer uplink CCs on which an aperiodic SRS is to be transmitted). Thereafter, the UE may simultaneously transmit aperiodic SRSs through one or more determined uplink CCs (S730). Due to maximum power limitation of the UE, it may be desirable that the UE transmit the SRS with a time delay for each uplink CC (S730).

As each UE can aperiodically transmit an SRS, a plurality of UEs may simultaneously transmit SRSs. When the plurality of UEs simultaneously transmits SRSs, the BS may group the abovementioned 1-bit triggering indicators as one message to inform the UEs. The BS may also group the UEs per CC among multiple uplink CCs to inform each grouped UE of the 1-bit triggering indicator. In other words, the grouped UE that can perform an independent command per CC is present. In this case, the BS directly transmits configuration of a group to the UEs through a group ID so that the processor 255 of the UE can decode group configuration information using the group ID. As a result, the UE can discern information about an uplink CC on which the aperiodic SRS is to be transmitted. Alternatively, since the BS does not inform the UE to which group the UE belong, although the UE does not know a group to which it belongs, a method may be considered in which the BS informs the UE of a structure and a position from which signals should be read. This is similar to a method used in a power control command of DCI format 3/3A.

Figure 8:
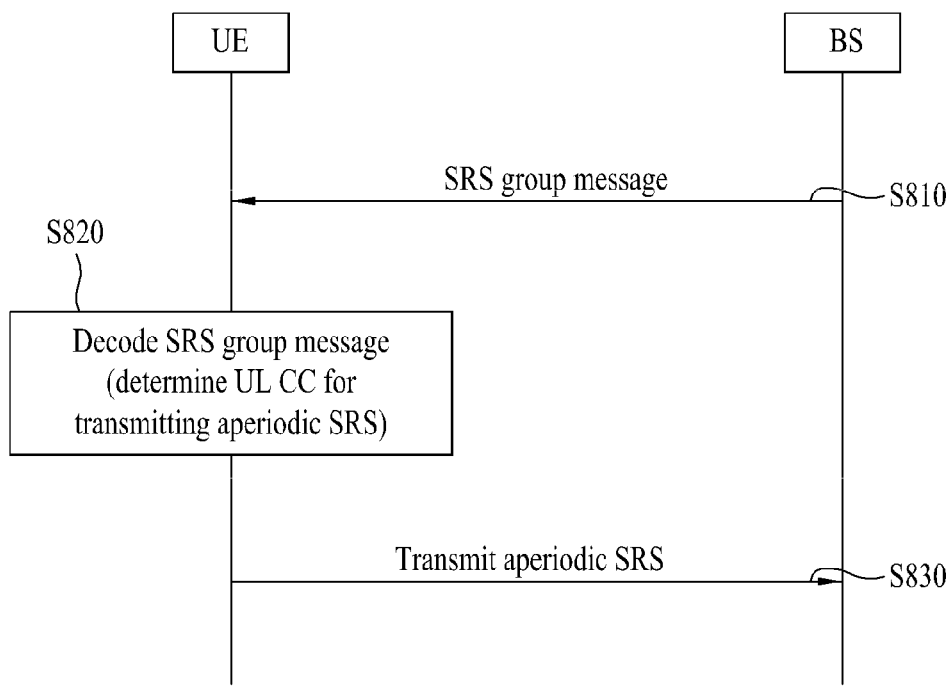
FIG. 8 is a diagram showing exemplary aperiodic SRS transmission of a UE according to another embodiment of the present invention.

FIG. 8 is a diagram showing exemplary aperiodic SRS transmission of a UE according to another embodiment of the present invention.

The BS may define a group SRS message format for aperiodic SRS transmission. In this case, the BS may scramble a group SRS message per uplink CC using a predefined aperiodic SRS-RNTI and transmit the group SRS message including the aperiodic SRS transmission triggering indicator (e.g. 1 bit) to the UE (S810). Accordingly, the UE receives the group SRS message for aperiodic SRS transmission and the processor 255 of the UE may obtain information about an uplink CC (e.g. uplink CC index) on which aperiodic SRS transmission is performed by decoding the SRS message divided by the aperiodic SRS-RNTI (S820). The UE may transmit an aperiodic SRS on a corresponding uplink CC (S830).

One DCI may include aperiodic SRS transmission commands for multiple uplink CCs. That is, the aperiodic SRS transmission triggering indicator may be defined as one of multiple commands in one DCI with respect to each uplink CC or may be a bundled command type (transmission or non-transmission of an aperiodic SRS). The aperiodic SRS transmission triggering indicator may be applied to all uplink activated CCs. The BS may inform the UE of a corresponding command or a position to which the corresponding command is transmitted with respect to each uplink CC.

Alternatively, the BS may transmit the aperiodic SRS transmission triggering indicator by reusing an already defined message format instead of defining a new message type. For instance, the BS may reuse DCI format 3/3A configured to use a group TPC command for transmit power control of a certain UE group. DCI format 3/3A is divided into TPC-PUCCH-RNTI and TPC-PUSCH-RNTI and a TPC index is included in a corresponding message. The UE may apply a TPC command based on a TPC index. The BS may inform the UE of such configuration defined in a higher layer (e.g. RRC level).

Hereinbelow, DCI format 3/3A will be described in more detail. Table 7 shown below indicates TPC-PDCCH-Config information element message type.

TABLE 7

TPC-PDCCH-Config information element

```
-- ASN1START
TPC-PDCCH-Config ::=     CHOICE {
    release              NULL,
    setup                SEQUENCE {
        tpc-RNTI             BIT STRING (SIZE (16)),
        tpc-Index            TPC-Index
    }
}
TPC-Index ::=            CHOICE {
    indexOfFormat3           INTEGER (1..15),
    indexOfFormat3A          INTEGER (1..31)
}
-- ASN1STOP
```

Referring to Table 7, the BS may transmit a tpc-RNTI parameter, a tpc-Index parameter, an indexOfFormat3 parameter, and an IndexOfFormat3A to the UE through a TPC-PDCCH-Config Information Element (IE) message. The tpc-RNTI parameter indicates an RNTI for power control, the tpc-Index parameter is a parameter informing the UE of a TPC index determined for a TPC command, the indexOfFormat3 parameter indicates a TPC index when DCI format 3 is used, and the IndexOfFormat3A parameter indicates a TPC index when DCI format 3A is used.

The TPC-PDCCH-Config IE message is a higher layer message corresponding to TPC command information and relates to DCI format 3/3A as a group TPC command. The BS groups UEs using TPC-PUCCH-RNTI and TPC-PUSCH-RNTI and informs the UEs of a TPC index (e.g. a 2-bit (−1, 0, 1, 3 [dB]) TPC command or a 1-bit (−1, 1 [dB]) TPC command) so that the UE can apply corresponding TPC commands to uplink power control. The TPC index is an integer from 1 to 15 in DCI format 3 and from 1 to 31 in DCI format 3A.

When a CC is extended to multiple UL CCs, the BS may configure a common TPC index or multiple TPC indexes using an RNTI per uplink CC. Alternatively, the BS may configure multiple TPC indexes by one RNTI or a combination thereof.

The BS may configure TPC-PUSCH-RNTI/TPC-PUCCH-RNTI per CC and a TPC index per CC, as a method for configuring DCI format 3 in a higher layer level. The following Table 8 and Table 9 indicate DCI format 3 and TPC indexes for DCI format 3, respectively.

TABLE 8

| TPC command 1 | TPC command 2 | TPC command 3 | TPC command 4 | ... | TPC command 14 | TPC command 15 | Parity bits |
|---|---|---|---|---|---|---|---|
| 2bits | 2bits | 2bits | 2bits | ... | 2bits | 2bits | |

TABLE 9

| Tpc-index 1 | Tpc-index 2 | Tpc-index 3 | Tpc-index 4 | ... | Tpc-index 14 | Tpc-index 15 |
|---|---|---|---|---|---|---|

Referring to Table 8, the BS may configure DCI format 3 in a higher layer level and transmit a corresponding TPC command to the UE. The UE may receive information about a TPC index through higher layer signaling. Then, the processor 255 of the UE may decode the TPC command corresponding to an already known TPC index and control uplink transmit power by applying a 2-bit value (e.g. −1, 0, 1, 3 [dB]) indicated by the corresponding TPC command.

The BS may add a 1-bit (or 2-bit or more) SRS transmission triggering indicator to configuration of DCI format 3 as shown in Table 8 as an ON/OFF type. That is, through the aperiodic SRS transmission triggering indicator (e.g. having a size of one bit), whether corresponding DCI is to be used for an SRS transmission command or a TPC command may be determined. The processor 255 of the UE may determine whether the corresponding DCI format is interpreted as the aperiodic SRS transmission triggering indicator or the TPC command by decoding the aperiodic SRS transmission triggering indicator included in the corresponding DCI. For example, when a bit value of the aperiodic SRS transmission triggering indicator is '1' (ON), UEs grouped into DCI format 3 are all triggered for aperiodic SRS transmission and can transmit an SRS. However, when the bit value of the aperiodic SRS transmission triggering indicator is '0' (OFF), the UEs do not transmit an SRS.

Alternatively, the BS may independently transmit the TPC command and the aperiodic SRS transmission triggering indicator to the UE. This is a method for allocating an index for a TPC and an index for an SRS and the UE does not need to determine which purpose the corresponding DCI has. This method may be applied to all LTE-A UEs grouped into DCI format 3 and is possible when resources of time and frequency domains of an SRS are permitted.

Up to now, the methods for the BS to transmit the aperiodic SRS transmission triggering indicator in various forms have been described. Now, a description as to when the UE transmits an aperiodic SRS if the UE has received the aperiodic SRS transmission triggering indicator through a DCI format is given.

The UE may transmit an SRS through an uplink subframe preconfigured for aperiodic SRS transmission at a time when the UE receives DCI including the aperiodic SRS transmission triggering indicator from the BS. If no allocated SRS resource is present when receiving the DCI, the UE may not transmit the SRS in the corresponding subframe. If aperiodic SRS transmission is triggered and the SRS has not been transmitted at a corresponding time, the UE may transmit the SRS at the next fastest timing or next configured timing.

A TPC index or multiple TPC indexes, each of 2 bits, may be used for aperiodic SRS transmission for one uplink CC. In this case, more precise control for SRS transmission resources (timing, antennas, bandwidths, code resources, etc.) to be used by the UE can be performed.

Alternatively, the aperiodic SRS transmission triggering indicator in DCI format 3 may be mapped bit by bit in the unit of a grouped TPC command. That is, the BS may use one bit per TPC index as an aperiodic SRS transmission command for other UEs or other uplink CCs. This has an advantage of individually enabling/disabling (ON/OFF) SRS transmission triggering in grouped UEs when more SRS resources than the number of grouped UEs are present. However, in this case, the amount of control information and signaling in a higher layer for DCI format 3 are increased compared with the case in which the aperiodic SRS transmission triggering indicator is comprised of one bit.

The following Table 10 and Table 11 indicate DCI format 3A and TPC indexes, respectively.

TABLE 10

| TPC command 1 | TPC command 2 | TPC command 3 | TPC command 4 | ... | TPC command 30 | TPC command 31 | Parity bits |
|---|---|---|---|---|---|---|---|
| 1 bit | 1 bit | 1 bit | 1 bit | ... | 1 bit | 1 bit | |

TABLE 11

| Tpc-index 1 | Tpc-index 2 | Tpc-index 3 | Tpc-index 4 | ... | Tpc-index 30 | Tpc-index 31 |
|---|---|---|---|---|---|---|

Referring to Table 10 and Table 11, the BS can transmit TPC commands to UEs by grouping UEs for which aperiodic SRS transmission is to be triggered according to a corresponding TPC command.

The above method may be extended to a method in which the BS uses the aperiodic SRS transmission triggering indicator (one bit or more) in a grouped message type.

According to the present invention, an uplink SRS of the UE supporting a plurality of uplink CCs supports maximized use efficiency of CCs and aids in improving system performance. In addition, the SRS transmission method according to the present invention can be achieved using a legacy system with a minimum amount of information as a method for supporting dynamic SRS transmission.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

INDUSTRIAL APPLICABILITY

The SRS triggering based SRS transmission method of the UE is applicable to various communication systems such as 3GPP LTE, LTE-A, IEEE 802.16m, etc.

The invention claimed is:

1. A method for transmitting an aperiodic Sounding Reference Signal (SRS) by a user equipment in a wireless communication system, the method comprising:
    receiving, from a base station, a downlink control information (DCI) format through a first component carrier of a plurality of component carriers configured for the user equipment, the DCI format including:
        an indicator indicating an index of an activated component carrier of the plurality of component carriers for an aperiodic SRS transmission, the index of the activated component carrier being different from an index of the first component carrier, and
        a multi-bits SRS request including:
            an indicator for triggering the aperiodic SRS transmission, and
            aperiodic SRS configuration information to be used for the aperiodic SRS transmission on the activated component carrier, and
    transmitting, to the base station, the aperiodic SRS through the activated component carrier based on:
        the indicator indicating the index of the activated component carrier, and
        the multi-bits SRS request.

2. The method of claim 1, wherein the aperiodic SRS configuration information indicate at least antenna, bandwidth, or time resource to be used for the aperiodic SRS transmission on the activated component carrier.

3. The method of claim 1, further comprising:
    receiving, from the base station through the first component carrier, aperiodic-SRS configuration information on each of component carriers configured for the user equipment, the aperiodic-SRS configuration information being component carrier-specifically configured.

4. The method of claim 3, wherein the aperiodic-SRS configuration information on each of the plurality of component carriers configured for the user equipment is received through a radio resource control (RRC) signal.

5. A user equipment for transmitting an aperiodic Sounding Reference Signal (SRS) in a wireless communication system, the user equipment comprising:
    a receiver configured to receive, from a base station, a downlink control information (DCI) format through a first component carrier of a plurality of component carriers configured for the user equipment, the DCI format including:
        an indicator indicating an index of an activated component carrier of the plurality of component carriers for an aperiodic SRS transmission, the index of the activated component carrier being different from an index of the first component carrier, and
        a multi-bits SRS request including:
            an indicator for triggering the aperiodic SRS transmission, and aperiodic SRS configuration information to be used for the aperiodic SRS transmission on the activated component carrier, and a transmitter configured to transmit, to the base station, the aperiodic SRS through the activated component carrier based on:

the indicator indicating the index of the activated component carrier, and the multi-bits SRS request.

6. The user equipment of claim 5, wherein the aperiodic SRS configuration information indicate at least antenna, bandwidth, or time resource to be used for the aperiodic SRS transmission on the activated component carrier.

7. The user equipment of claim 5, wherein the receiver is further configured to receive, from the base station through the first component carrier, aperiodic-SRS configuration information on each of component carriers configured for the user equipment, the aperiodic-SRS configuration information being component carrier-specifically configured.

8. The user equipment of claim 7, wherein the aperiodic-SRS configuration information on each of the plurality of component carriers configured for the user equipment is received through a radio resource control (RRC) signal.

* * * * *